(12) United States Patent
Chamayou et al.

(10) Patent No.: US 10,941,222 B2
(45) Date of Patent: Mar. 9, 2021

(54) PROCESS FOR OPERATING A POLYMER POWDER DEGASSER VESSEL

(71) Applicant: INEOS EUROPE AG, Vaud (CH)

(72) Inventors: Jean-Louis Chamayou, Carry le Rouet (FR); Laure Guignes, Ensues la Redonne (FR); Miguel Angel Navarro De Castro, Martigues (FR)

(73) Assignee: INEOS EUROPE AG, Vaud (CH)

( * ) Notice: Subject to any disclaimer, the term of this patent is extended or adjusted under 35 U.S.C. 154(b) by 9 days.

(21) Appl. No.: 16/461,540

(22) PCT Filed: Nov. 30, 2017

(86) PCT No.: PCT/EP2017/081010
§ 371 (c)(1),
(2) Date: May 16, 2019

(87) PCT Pub. No.: WO2018/100076
PCT Pub. Date: Jun. 7, 2018

(65) Prior Publication Data
US 2019/0352438 A1 Nov. 21, 2019

(30) Foreign Application Priority Data

Dec. 2, 2016 (GB) ..................... 1620525

(51) Int. Cl.
*C08F 10/02* (2006.01)
*C08F 6/00* (2006.01)
(Continued)

(52) U.S. Cl.
CPC .............. *C08F 6/005* (2013.01); *B01D 49/00* (2013.01); *C08F 2/01* (2013.01); *C08F 2/34* (2013.01);
(Continued)

(58) Field of Classification Search
None
See application file for complete search history.

(56) References Cited

U.S. PATENT DOCUMENTS

| 2,856,083 A | 10/1958 | Corrigan |
| 3,152,872 A | 10/1964 | Scoggin et al. |

(Continued)

FOREIGN PATENT DOCUMENTS

| CH | 336319 | 2/1959 |
| DE | 10 2004 018 436 | 11/2005 |

(Continued)

OTHER PUBLICATIONS

International Search Report and Written Opinion of the ISA for PCT/EP2017/081010 dated Mar. 15, 2018, 15 pages.
(Continued)

*Primary Examiner* — Richard A Huhn
(74) *Attorney, Agent, or Firm* — Nixon & Vanderhye PC (57) ABSTRACT

The present invention relates to a process for operating a polymer powder degasser vessel, and in particular provides a process for operating a polymer powder degasser vessel which vessel comprises a silo comprising a main vertical cylinder and a hopper at the bottom of the cylinder, there being a polymer powder withdrawal pipe connected to the hopper by which polymer powder is withdrawn from the hopper, and wherein the silo contains a polymer powder which occupies less than 45% of the volume of the silo and the polymer powder passes through the polymer powder degasser vessel in a mass flow manner, further wherein at least one of the following is applied: i) polymer powder is withdrawn from the hopper and recirculated to the silo, wherein the recirculation rate of the polymer powder is at least 30 percent per hour of the polymer powder present in the silo, and ii) a purge gas is provided to the silo via the polymer powder withdrawal pipe or via an inlet located on (Continued)

the hopper at a vertical height which is less than half of height of the hopper from its bottom end.

28 Claims, 2 Drawing Sheets

(51) Int. Cl.
| | |
|---|---|
| *B01D 49/00* | (2006.01) |
| *C08F 10/06* | (2006.01) |
| *C08F 2/01* | (2006.01) |
| *C08F 2/34* | (2006.01) |
| C08F 210/02 | (2006.01) |
| B29B 13/00 | (2006.01) |

(52) U.S. Cl.
CPC .............. *C08F 10/02* (2013.01); *C08F 10/06* (2013.01); *B29B 2013/005* (2013.01); *C08F 210/02* (2013.01); *C08J 2323/06* (2013.01); *C08J 2323/08* (2013.01); *C08J 2323/16* (2013.01)

(56) References Cited

U.S. PATENT DOCUMENTS

| | | | |
|---|---|---|---|
| 3,242,150 | A | 3/1966 | Scoggin et al. |
| 3,724,416 | A | 4/1973 | Diamond et al. |
| 3,791,341 | A | 2/1974 | Diamond et al. |
| 3,957,448 | A | 5/1976 | Shepard et al. |
| 3,965,083 | A | 6/1976 | Jezl et al. |
| 3,971,768 | A | 7/1976 | Peters et al. |
| 4,286,883 | A | 9/1981 | Johanson |
| 4,345,842 | A | 8/1982 | Peschl |
| 4,372,758 | A | 2/1983 | Bobst et al. |
| 4,613,484 | A | 9/1986 | Ayres et al. |
| 5,292,863 | A | 3/1994 | Wang |
| 5,376,742 | A | 12/1994 | Krause |
| 5,478,922 | A | 12/1995 | Rhee et al. |
| 5,688,910 | A | 11/1997 | Wang |
| 5,799,412 | A | 9/1998 | Yamamoto et al. |
| 2008/0166272 | A1 | 7/2008 | Chamayou et al. |
| 2012/0259085 | A1* | 10/2012 | Chamayou .............. C08F 6/005 526/352 |
| 2016/0347875 | A1 | 12/2016 | Chamayou et al. |

FOREIGN PATENT DOCUMENTS

| | | |
|---|---|---|
| EP | 0 047 077 | 3/1982 |
| EP | 0 127 253 | 12/1984 |
| EP | 0 475 603 | 3/1992 |
| EP | 0 596 434 | 5/1994 |
| EP | 0 683 176 | 11/1995 |
| EP | 0 855 411 | 7/1998 |
| EP | 1 240 217 | 9/2002 |
| EP | 1 484 344 | 12/2004 |
| EP | 1 381 634 | 11/2008 |
| EP | 2 357 035 | 8/2011 |
| GB | 757986 | 9/1956 |
| GB | 1102402 | 2/1968 |
| GB | 1 228 870 | 4/1971 |
| GB | 2 030 512 | 4/1980 |
| WO | WO 2004/047959 | 6/2004 |
| WO | WO 2006/082007 | 8/2006 |
| WO | WO 2008/024517 | 2/2008 |
| WO | WO 2009/121721 | 10/2009 |
| WO | 2011/085937 | 7/2011 |
| WO | 2013/056979 | 4/2013 |

OTHER PUBLICATIONS

Beret et al., "Purging Criteria for LDPE Make Bins" *CEP*, Dec. 1977, pp. 44-49.
Carson et al., "Silo Failures: Why Do They Happen?" *Task Quarterly* 7, No. 4, 2003, pp. 499-512.
Hartikainen, Declaration by technical expert, Nov. 3, 2016 (Porvoo, Finland).
Hungenberg, "Polymer Processes" *BASF AG Ludwigshafen*, Vorlesung Polymerisationstechnik, Universität Paderborn WS 07/08, pp. 1-93.
Jenike, "Storage and Flow of Solids" Bulletin No. 123 of the Utah Engineering Experiment Station, Nov. 1964 (Sixth Printing—revised Nov. 1976), p. 133.
Klaus et al., "Blending and Homogenizing Bulk Materials in Silos", *Bulk Material Symposium* 25th/26th of Mar. 1993, pp. 101-108.
Li et al., "Vertical pneumatic moving-bed transport-II. Experimental findings" *Chemical Engineering Science*, vol. 44, No. 2, pp. 261-271, 1989.
Marcus et al., *Pneumatic Conveying of Solids*, Chapman and Hall, 1990, Figure 1.5 & pp. 15, 296, 297.
Marinelli et al., "Solve Solids Flow Problems in Bins, Hoppers, and Feeders" Jenike & Johanson Incorporated, Jun. 2001, <http://info.jenike.com/technical-papers/bins-hoppers-feeders>.
Mehos "Designing and Operating Gravity Dryers" *Chemical Engineering*, pp. 34-39 (May 2009).
Mickiewicz et al., "Composition of Bulk Solid Discharged from a Bin with Continuous Recirculation" *Powder Technology*, 22 (1979) 97-100.
Notice of Opposition issued in EP Appln. No. 10 796 429.8 dated Jan. 18, 2017.
Perry et al., *Perry's Chemical Engineers' Handbook*, Seventh Edition, International Editions 1998, McGraw-Hill, pp. 23-35 to 23-36.
Purutyan et al., "Solve Solids Handling Problems by Retrofitting" *Chemical Engineering Progress*, Apr. 1998, pp. 27-39.
PutmanMedia, "How to reduce caking problems" dated Jul. 5, 2005 <http://www.chemicalprocessing.com/articles/2005/499/>.
Rhodes, "Storage and Flow of Powders—Hopper Design" *Introduction to Particle Technology*, Ch. 8, pp. 193-196, 1998, Australia.
Schmidt et al., "Hydraulic Conveying of Plastic Pellets" *ANTEC* 2004, pp. 424-428.
Schulze, "Storage of Powders and Bulk Solids in Silos", publication at <http://www.dietmar-schulze.de/storagepr.html>, © 1996-2006, last updated on Jul. 7, 2006, pp. 1-12, accessed Nov. 28, 2014.
Schulze, *Powders and Bulk Solids—Behavior, Characterization, Storage and Flow*, Springer, 2008, pp. 312-313.
U.S. Appl. No. 60/840,163, filed Aug. 25, 2006 in the name of Timothy O. Odi (priority application of WO 2008/024517).
Wayback Machine, www.chemicalprocessing.com from Jul. 10, 2005, accessed Nov. 28, 2014, <http://web.archive.org/web/20050710025859> <http://www.chemicalprocessinq.com/>.
Wilms et al. "Gravity Flow Blending Silos for Polymer Quality Improvement" pp. 415-427 (1997).
Wilms, "Reducing costs in the preparation of plastics" *Plastics Engineering*, VDI Publishing, Dusseldorf, 1994, pp. 73-93 (w/ translation).
Wilms, "Inserts in silos for blending" *Silos: Fundamentals of Theory, Behaviour and Design*, edited by C.J. Brown and J. Nielsen, 1998, pp. 131-133.
Wilms et al. "Testing and Process Design for Degassing Silos" *Polypropylen*, World Congress, Sep. 26-28, 2006, Session III-3.
Woodcock et al., *Bulk Solids Handling—An Introduction to the Practice and Technology*, Blackie Academic & Professional, Glasgow, 1995, pp. 168-171.

\* cited by examiner

PROCESS FOR OPERATING A POLYMER POWDER DEGASSER VESSEL

This application is the U.S. national phase of International Application No. PCT/EP2017/081010 filed Nov. 30, 2017 which designated the U.S. and claims priority to GB Patent Application No. 1620525.4 filed Dec. 2, 2016, the entire contents of each of which are hereby incorporated by reference.

The present invention relates to a process for operating a polymer powder degasser vessel.

Polymer powder vessels, such as storage and/or degasser vessels have been extensively used in polymer production plants. Bulk material is frequently stored and/or transported in hoppers and silos. The discharge, transport and/or emptying of such hoppers and silos can cause troubles. On the market, different discharge pads are offered, e.g. bin discharger and vibrating bin dischargers as well as aeration nozzles.

WO 2011/085937 describes a polymer powder vessel and a process for operating said vessel which alleviate some of the issues during operation of a polymer powder degassing process, in particular due to a failure of downstream equipment meaning that polymer powder withdrawal must be reduced or stopped.

It has now been found that particular operations in polymer powder degasser vessels can provide yet further advantages, particularly when relatively low amounts of polymer powder may be present in vessels to which purge gas is applied.

Thus, in a first aspect the present invention provides a process for operating a polymer powder degasser vessel which vessel comprises a silo comprising a main vertical cylinder and a hopper at the bottom of the cylinder, there being a polymer powder withdrawal pipe connected to the hopper by which polymer powder is withdrawn from the hopper, and wherein the silo contains a polymer powder which occupies less than 45% of the volume of the silo and the polymer powder passes through the polymer powder degasser vessel in a mass flow manner, further wherein at least one of the following is applied:
i) polymer powder is withdrawn from the hopper and recirculated to the silo, wherein the recirculation rate of the polymer powder is at least 30 percent per hour of the polymer powder present in the silo, and
ii) a purge gas is provided to the silo via the polymer powder withdrawal pipe or via an inlet located on the hopper at a vertical height which is less than half of height of the hopper from its bottom end.

The present invention relates to operating a polymer powder degasser vessel which vessel comprises a silo comprising a main vertical cylinder and a hopper at the bottom of the cylinder. The person skilled in the art understands that vessels which comprise a silo comprising a main vertical cylinder and a hopper at the bottom of the cylinder may be present for a number of different purposes in an industrial process, such as a polymerisation process. Such vessels are generally named according to the principal purpose for which they are used and for which they have therefore been designed, such as "degasser vessel", "storage vessel" or "blending vessel" (or "silo"), and the structure and internals of such vessels are generally different depending on the use.

As used herein, any reference to a "degasser" or "degasser vessel" means a vessel designed principally for the removal of absorbed hydrocarbons, and "polymer powder degassing vessel therefore means a a vessel designed principally for the removal of absorbed hydrocarbons from polymer powder. The term "designed principally for the removal of absorbed hydrocarbons" means this is the primary purpose of the vessel and is the primary consideration in its design.

An important feature for polymer powder degassing vessels, and a requirement of the first aspect of the present invention, is that the polymer powder passes through the polymer powder degasser vessel in a mass flow manner. The flow being in a "mass flow manner" means that when some polymer is withdrawn from the hopper all polymer above this in the silo moves down. (Such flow can also be characterised as a "first in/first out" operation.) In the absence of recirculation and under continuous operation this gives a narrow residence time distribution of the polymer powder in the silo, which ensures homogeneous degassing. Typically, in operation without recirculation a "degasser" or "degasser vessel" will have a maximum residence time lower than that of a typical storage vessel and a residence time distribution much narrower than a blending or mixing vessel. The polymer powder degassing vessel according to the present invention generally has a mean residence time of less than 5 hours and a residence time distribution wherein all particles have a residence time within 30% of the mean residence time (both being defined in the absence of recirculation). The polymer powder degasser vessel according to the present invention is preferably operated with a continuous feed of polymer powder to the vessel.

Another typical characteristic of "degassers"/"degasser vessels" used for polymer powder is that they are fed with polymer powder which contains significant quantities of absorbed hydrocarbons to be removed. For the purposes of the present invention the polymer powder degasser vessel will remove at least 1 kg of hydrocarbons per tonne of polymer passed through the vessel (1000 ppmw).

For avoidance of any doubt therefore, for the purposes of the present invention the term "degasser" or "degasser vessel" does not include a storage vessel or a blending vessel. This is the case even if some hydrocarbons may be present on the polymer fed to such other vessels which may desorb therefrom since such vessels are principally designed for storage or blending respectively. This is also the case even if such vessels are additionally provided with means to prevent the build-up of such hydrocarbons by removal thereof since, even if this may be considered a form of degassing, this is not the primary purpose of the vessel. Not least, the polymer passed to a blending or storage vessel has usually already undergone one or more degassing steps such that the amount of hydrocarbons to be removed will generally be much less than 1 kg per tonne of polymer passed through the vessel. "Blending vessels" in particular, may also be distinguished from the polymer powder degassing vessels of the present invention because the act of blending/mixing means different polymer powder particles must pass through the vessel with different residence times, and hence such vessels would be expected to, and are in fact designed to, provide a much broader residence time distribution for the materials fed thereto.

The requirements of mass flow can be achieved by appropriate design of the silo, and in particular of the hopper and polymer powder withdrawal pipe. Examples of documents which describe the different types of flow and the designs to control them include Marinelli & Carson "Solve Solids Flow Problems in Bins, Hoppers and Feeders" published in Chemical Engineering Progress, June 2001, and available from http://info.jenike.com/technical-papers/bins-hoppers-feeders.

Mass flow can be contrasted with funnel flow, where some material may pass quickly through the central part of the flow whilst other material can remain in the silo at the edges for a significantly longer time. Mass flow is important for degassing vessels to avoid polymer passing through the vessel with low residence time and therefore potentially insufficient degassing.

In the present invention the polymer powder is withdrawn from the silo via a polymer powder withdrawal pipe connected to the hopper. This polymer powder withdrawal pipe is preferably connected to the bottom end of the cone of the hopper and preferably to the centre of the cone of the hopper. The diameter of this pipe is chosen to ensure the powder mass flow in the silo and to minimise the risk of stable arch formation in the cone of the hopper.

In the first aspect of the present invention the polymer powder occupies less than 45% of the volume of the silo. As used herein the volume of the silo is the total volume of the vertical cylinder and the hopper at the bottom of the cylinder. The volume of polymer powder present in the silo may be determined by any known technique. One example is to determine the volume using mass balance calculations, and in particular by comparing polymer fed to polymer withdrawn. Alternatively, the volume can be measured experimentally, for example using probes on the wall of the silo or using a nucleonic level measurement.

Preferably the polymer powder occupies less than 30% of the volume of the silo, such as less than 20% of the volume of the silo. Such a low amount of "fill" of the silo may be obtained, for example, during a start-up. An issue of such a low amount of fill is that either the residence time of the polymer powder in the silo is relatively low, which in a degasser vessel risks that not all of the polymer is sufficiently degassed, or the polymer powder passage through the silo must be slowed or stopped to increase residence time, increasing the risk of agglomeration or blockage.

In the first aspect of the present invention, to alleviate this issue, one option is to provide a relatively large recirculation rate, defined as at least 30 percent per hour of the polymer powder present in the silo. This can increase the average residence time of the polymer powder without slowing the polymer powder passing through the silo. The recirculation rate is preferably at least 40 percent per hour of the polymer powder present in the silo, and possibly even higher at very low fill levels.

The recirculation rate as used herein should be that obtained by determining the total amount of polymer powder recirculated in 5 minutes, converting this to a recirculation rate per hour (e.g. in Te/hr) and then dividing this value by the average amount of polymer powder present in the silo (e.g. in Te) over the same 5 minute period.

It is preferred, at least whilst the polymer powder occupies less than 45% of the volume of the silo, that recirculation is performed continuously at a recirculation rate equivalent to at least 30 percent per hour of the polymer powder present in the silo. However, it is also possible to operate with periods where the recirculation rate is equivalent to less than 30 percent per hour of the polymer powder present in the silo or even with periods without recirculation. In this case the average recirculation rate over a longer period of time, such as 1 hour, may be at least 30 percent per hour of the polymer powder present in the silo even if it is not continuously so.

A portion of the polymer powder exiting the silo may be passed to further processing whilst the remainder is recirculated. In one embodiment all polymer powder exiting the silo is recirculated in this manner (i.e. none is withdrawn to further processing) which allows the polymer powder level to build-up faster in the silo. The recirculation, when applied, is preferably continued until the powder volume in the silo increases to enable a sufficient residence time without recirculation and/or a volume of polymer powder which occupies at least 50% of the silo. In the preferred embodiments of the present invention it is generally a residence time of at least 15 minutes (without recirculation). The "sufficient residence time without recirculation" can, additionally or alternatively, be defined relative to the residence time of the polymer powder without recirculation during normal operation of the vessel. The "sufficient residence time without recirculation" defined in this way is preferably at least 50% of the residence time of the polymer powder without recirculation during normal operation of the vessel. Where the residence time during normal operation can vary, for example due to varying levels of polymer powder, then this should be at least 50% of the minimum residence time during normal operation.

In a second option, a purge gas is provided to the silo via the polymer powder withdrawal pipe or via an inlet located on the hopper at a vertical height which is less than half of height of the hopper from its bottom end.

An issue with such a low level inlet is that it provides an impediment to the smooth flow of polymer powder in the hopper. It is for this reason that gas inlets on degasser vessels and other vessels provided with a purge gas are normally provided on the silo on the side wall of the cylinder above the hopper. The fact that the inlet is not close to the bottom of the silo is not an issue when the silo is full of polymer powder since the residence time of the polymer above the inlet is still sufficient to enable sufficient contact of the purge gas and the polymer powder before the powder enters the hopper. However, where the silo is less than 45% full then the residence time of the polymer above the purge gas inlet is significantly reduced.

In the present invention this is solved by the provision of a "low level" purge gas inlet. Where the purge gas is provided via a separate inlet this is located on the hopper at a vertical height which is less than half of height of the hopper from its bottom end. Introducing the purge gas at such a low level helps to ensure that the polymer powder is degassed for as much of its residence time in the silo as possible. The inlet is preferably as close to the bottom end as practical, such as less than a quarter of the height of the hopper from its bottom end.

Preferably, the purge gas is provided to the silo via the polymer powder withdrawal pipe itself, for example via an inlet located on the polymer powder withdrawal pipe below the hopper.

In one embodiment withdrawal of polymer powder from the silo/hopper is stopped whilst purge gas is applied. This is particularly so where the purge gas is provided to the silo via the polymer powder withdrawal pipe itself. To ensure that the polymer powder is not stationary in the hopper itself sufficient purge gas can be applied to cause agitation of the polymer powder in the hopper, especially at low volumes of polymer powder. It is generally preferred, however, that the gas velocity is less than the minimum fluidization velocity of the polymer powder in the hopper. A particular advantage of providing the purge gas to the silo via the polymer powder withdrawal pipe when withdrawal is stopped is that the flow of purge gas can also be used to keep the pipe clear of settled polymer.

It is also possible in this embodiment to switch between purging and withdrawal steps, wherein polymer powder is removed intermittently from the silo by stopping the flow of purge gas, or at least reducing is significantly, withdrawing some of the polymer powder from the silo, then stopping withdrawal and starting (or increasing) the flow of purge gas again. Operation can be continued in this manner at relatively low levels of polymer powder in the silo.

Preferably, however, purging under this option is continued until the powder volume in the silo increases to enable a sufficient residence time with a purge gas inlet on the side of the cylinder, typically a residence time of at least 15 minutes (without recirculation) and/or a volume of polymer powder which occupies of at least 50% of the silo. Then this "low level" purge can be turned off.

As noted above, the first aspect of the present invention is applied when the polymer powder occupies less than 45% of the volume of the silo, such as obtained during a start-up. As also noted above, this manner of operation can be stopped once a higher level of polymer powder is obtained in the silo. Thus, the conditions used in the silo can be altered depending on the amount of polymer present therein.

In a preferred embodiment of the first aspect there is provided a process for operating a polymer powder degasser vessel which comprises a silo comprising a main vertical cylinder and a hopper at the bottom of the cylinder, there being a polymer powder withdrawal pipe connected to the hopper by which polymer powder is withdrawn from the hopper, and a polymer powder inlet pipe connected to the vessel at a height located above the polymer powder in the silo, and wherein the silo contains a polymer powder which occupies less than 45% of the volume of the silo, characterised in that the polymer powder is withdrawn from the hopper via the polymer powder withdrawal pipe and is recirculated to the silo via the polymer powder inlet pipe, and further wherein the recirculation rate of the polymer powder is at least 30 percent per hour of the polymer powder present in the silo.

In this preferred embodiment of the present invention the polymer powder withdrawn from the hopper is recirculated to the silo via a polymer powder inlet pipe. More than one polymer powder inlet pipe may be present and connected to the vessel at heights located above the polymer powder in the silo.

In particular, polymer powder from an upstream step, preferably from a polymerisation reactor, is generally introduced into the vessel (and to the silo) via a polymer powder inlet pipe. This will be referred to hereinafter as a first polymer powder inlet pipe. This first polymer powder inlet pipe is connected to the vessel at a height located above the surface of the polymer powder inside the silo. The pipe is preferably connected to the top of the vessel, and most preferably connected to the top or the dome of the vessel roof and more preferably to the centre of this top or dome.

The polymer powder withdrawn from the hopper can be recirculated to the silo via the first polymer powder inlet pipe i.e. can be combined with and introduced to the vessel with the polymer powder from an upstream step.

Alternatively, the polymer powder withdrawn from the hopper can be recirculated via a second polymer powder inlet pipe i.e. a separate polymer powder inlet pipe to the first polymer powder inlet pipe. In this embodiment, the second polymer powder inlet pipe may be connected to the top of the vessel, such as connected to the top or the dome of the vessel roof, but preferably the second polymer powder inlet pipe is located directly on the silo (i.e. connected directly to the silo).

According to a preferred embodiment of the present invention, a single polymer powder withdrawal pipe is divided into a main polymer powder withdrawal pipe and a secondary polymer powder recirculation pipe. Said polymer powder recirculation pipe is then connected to a polymer powder inlet pipe as described above. In this preferred embodiment, the separation between the main polymer powder withdrawal pipe and the polymer powder recirculation pipe can be made by any appropriate means, e.g. via a diverter valve. The polymer powder recirculation line is preferably connected to a nitrogen pneumatic transport device which facilitates the recirculation of the powder to the top of the silo.

In a second aspect therefore the present invention provides a process for operating a polymer powder degasser vessel which comprises a silo comprising a main vertical cylinder and a hopper at the bottom of the cylinder, there being a polymer powder withdrawal pipe connected to the hopper by which polymer powder is withdrawn from the hopper, and which process comprises switching between a first set of conditions which are applied when the silo contains a first amount of polymer powder and a second set of conditions which are applied when the silo contains a second amount of the same polymer powder, the first and second amounts being different, and wherein at least one of the following applies:

i) the second amount of polymer powder is greater than the first amount of polymer powder, and the flow rate at which polymer powder is withdrawn from the hopper and recirculated to the silo is less in the second set of conditions than in the first set of conditions, ii) the second amount of polymer powder is less than the first amount of polymer powder, and the flow rate at which polymer powder is withdrawn from the hopper and recirculated to the silo is higher in the second set of conditions than in the first set of conditions, iii) the locations by which purge gas is supplied to the silo differ in the second set of conditions compared to the first set of conditions.

In this aspect the polymer powder degasser vessel and silo are generally as described in the first aspect.

In a first option (option (i)) the second amount of polymer is greater than the first amount. Such an option may occur during a start-up. The first amount of polymer is preferably such that the polymer powder occupies less than 45% of the volume of the silo, more preferably less than 30% of the volume of the silo, such as less than 20% of the volume of the silo. In some embodiments the first amount of polymer is preferably such that the polymer powder occupies less than 10% of the volume of the silo, such as less than 5% of the volume of the silo, or even less than 1% of the volume of the silo, The second amount is preferably such that the polymer powder occupies at least 50% of the volume of the silo, more preferably at least 60% of the volume of the silo, such as at least 70% by volume of the silo. Alternatively, the second amount is preferably such that the polymer powder occupies at least 20% by volume of the silo more than the first amount. Thus, if the first amount is 25% then the second amount is at least 45%. The second amount is more preferably such that the polymer powder occupies at least 30% by volume of the silo more than the first amount, such as at least 50% by volume of the silo more than the first amount.

In this option the second set of conditions differs from the first set of conditions in that the flow rate at which polymer powder is withdrawn from the hopper and recirculated to the silo is less in the second set of conditions than in the first set of conditions.

The flow rate in this aspect is preferably measured as an absolute flow rate, for example in tonnes/hour, although it will be apparent that if a lower flow rate is used in the second set of conditions and the amount of polymer in the silo is also increased then the recirculation rate is also lower as well as the absolute flow rate. The recirculation flow rate under the first set of conditions will depend on the size of the silo, but in a typical polymer powder degasser vessel may be expected to be at least 1 tonne per hour, such as at least 2 tonnes per hour, and most preferably at least 5 tonnes per hour for example 5 to 10 tonnes per hour. Measured as a recirculation rate it is preferably at least 30% percent per hour of the polymer powder present in the silo, and more preferably at least 40 percent per hour of the polymer powder present in the silo, and possibly even higher at very low fill levels.

The recirculation flow rate under the second set of conditions may be, and preferably is, zero i.e. there is no recirculation. More generally, it is preferably less than 50% of the recirculation flow rate under the first set of conditions.

In a second option (option (ii)) the second amount of polymer is less than the first amount. Such an option may occur during a shut-down or the emptying of a silo, or during a transition. In this case the second amount of polymer is preferably such that the polymer powder occupies less than 45% of the volume of the silo, more preferably less than 30% of the volume of the silo, such as less than 20% of the volume of the silo. In some embodiments the first amount of polymer is preferably such that the polymer powder occupies less than 10% of the volume of the silo, such as less than 5%© of the volume of the silo, or even less than 1% of the volume of the silo, The first amount is preferably such that the polymer powder occupies at least 50% of the volume of the silo, more preferably at least 60% of the volume of the silo, such as at least 70% by volume of the silo. Alternatively, the first amount is preferably such that the polymer powder occupies at least 20% by volume of the silo more than the second amount. Thus, if the second amount is 25% then the first amount is at least 45%. The first amount is more preferably such that the polymer powder occupies at least 30% by volume of the silo more than the second amount, such as at least 50% by volume of the silo more than the second amount.

In this option the second set of conditions differs from the first set of conditions in that the flow rate at which polymer powder is withdrawn from the hopper and recirculated to the silo is higher in the second set of conditions than in the first set of conditions.

The flow rate in this aspect is preferably measured as an absolute flow rate, for example in tonnes/hour, although it will be apparent that if a higher flow rate is used in the second set of conditions and the amount of polymer in the silo is also decreased then the recirculation rate is also higher as well as the absolute flow rate. The recirculation flow rate under the second set of conditions will depend on the size of the silo, but in a typical polymer powder degasser vessel may be expected to be at least 1 tonne per hour, such as at least 2 tonnes per hour, and most preferably at least 5 tonnes per hour for example 5 to 10 tonnes per hour. Measured as a recirculation rate it is preferably at least 30% percent per hour of the polymer powder present in the silo, and more preferably at least 40 percent per hour of the polymer powder present in the silo, and possibly even higher at very low fill levels.

The recirculation flow rate under the first set of conditions may be, and preferably is, zero i.e. there is no recirculation. More generally, it is preferably less than 50% of the flow rate under the second set of conditions.

In a third option (option (iii)) the locations by which purge gas is supplied to the silo differ in the second set of conditions compared to the first set of conditions.

Preferably, the silo comprises at least one inlet by which purge gas is provided which is located on the cylinder section of the silo (hereinafter "cylinder inlet") and at least one inlet by which purge gas is provided to the silo via the polymer powder withdrawal pipe or via an inlet located on the hopper at a vertical height which is less than half of height of the hopper from its bottom end (hereinafter "hopper inlet").

In this case, where the second amount of polymer powder is greater than the first amount of polymer powder then flow rate of purge gas introduced via the hopper inlet is less under the second set of conditions than the flow rate introduced via the hopper inlet under the first conditions. In contrast, where the second amount of polymer powder is less than the first amount of polymer powder then flow rate of purge gas introduced via the hopper inlet is higher under the second set of conditions than the flow rate introduced via the hopper inlet under the first conditions.

The smaller amount of polymer in this option is preferably such that the polymer powder occupies less than 45% of the volume of the silo, more preferably less than 30% of the volume of the silo, such as less than 20% of the volume of the silo. In some embodiments the first amount of polymer is preferably such that the polymer powder occupies less than 10% of the volume of the silo, such as less than 5% of the volume of the silo, or even less than 1% of the volume of the silo, The larger amount of polymer in this option is preferably such that the polymer powder occupies at least 50% of the volume of the silo, more preferably at least 60% of the volume of the silo, such as at least 70% by volume of the silo. Alternatively, the larger amount is preferably such that the polymer powder occupies at least 20% by volume of the silo more than the smaller amount. Thus, if the smaller amount is 25% then the larger amount is at least 45%. The larger amount is more preferably such that the polymer powder occupies at least 30% by volume of the silo more than the smaller amount, such as at least 50% by volume of the silo more than the smaller amount.

Where the larger amount occupies at least 50% by volume of the silo then it is preferred that no purge gas is applied to the hopper inlet under the corresponding set of conditions i.e. if the second amount of polymer powder is such that the polymer powder occupies at least 50% of the volume of the silo then no purge gas is applied to the hopper inlet. Alternatively, however, purge gas may be supplied to both the hopper inlet and the cylinder inlet (or in more general terms may be supplied to all locations) under both the first and second conditions, but the locations will differ in respect of the flow rates of purge gas used under the first and second set of conditions.

As with the first aspect of the present invention the hopper inlet is preferably an inlet by which the purge gas is provided to the silo via the polymer powder withdrawal pipe itself, for example via an inlet located on the polymer powder withdrawal pipe below the hopper.

More generally, in the present invention (first and second aspects) the polymer powder may be selected from a wide variety of polymer products. More preferably the polymer powder is a polyethylene or a polypropylene. Polyethylenes are the preferred products, and the most preferred product is linear low density polyethylene (LLDPE), especially based on copolymers of ethylene with 1-butene, 1-hexene or 1-octene. The process is also suitable for very low density polyethylene (VLDPE) and high density polyethylene (HDPE), especially copolymers of ethylene with a small portion of higher alpha olefin, for example, 1-butene, 1-pentene, 1-hexene or 1-octene.

The average ("mean") particle size of the polymer powder is preferably lower than 2000, preferably comprised between 200 and 1800, more preferably comprised between 500 and 900 microns. Any conventional means for example a Malvern or a mesh sieving technique can be used to measure the average ("mean") particle size of the polymer powder. For the purposes of the present invention and appended claims, the average ("mean") particle size is a D50 measurement made applying ISO-13320 using a Malvern Mastersizer.

The polymer powder is preferably a virgin polymer powder, i.e. a powder which does not contain any additives, e.g. additives like antioxidants and stabilizers.

The present invention is particularly applicable when the polymer powder is subsequently subjected to an extrusion process.

Polymer powder degasser vessels are well known by the man skilled in the art. Examples thereof can be found, for example, in EP 0683176, EP 0596434 and U.S. Pat. No. 5,376,742. It can be, for example, a primary degasser, secondary degasser, combined degasser or final degasser (also known as polisher). A primary degasser (sometimes referred as a flasher) usually operates by depressurising the polymer powder which comes from the polymerisation reactor. This can be done with the use of a purge gas, sometimes referred to as a "sweep gas", although gas sweeping is not mandatory in this first stage flasher in which the main objective is the gas solid separation. For example, EP 0127253 describes a process for the removal of residual monomers from ethylene copolymers by subjecting the copolymer to a reduced pressure zone sufficient to desorb the monomer, sweeping the copolymer with reactor gas which is free of inert gases and recycling the resultant gas containing the desorbed monomer to the polymerisation zone. A secondary degasser usually operates by contacting the polymer powder coming from a primary degasser with a purge gas, sometimes referred to as a "stripping gas". U.S. Pat. No. 4,372,758, for example, describes a degassing process which uses an inert gas such as nitrogen for the removal of unreacted gaseous monomer from the polymer product. Solid polymer is conveyed to the top of a purge vessel by means of an inert gas system, an inert gas stream is introduced into the bottom of the purge vessel and the solid polymer is counter currently contacted with the inert gas stream to remove the unreacted gaseous monomers from the solid polymer product. The unreacted monomers and the inert gas stream recovered are often passed to a flare for disposal or vented to the atmosphere. A combined degasser is usually a combination of a primary degasser and a secondary degasser. Such a combined degasser vessel would normally have a first degassing section located in an upper section, and polymer from the first degassing step would fall by gravity into the second degassing section located below. Finally, a polisher or final degasser column is usually a countercurrent degasser wherein the polymer powder flows downwards by gravity and a purge gas is injected at the bottom of the vessel via specifically designed gas distributors. The purge gas must be essentially free of hydrocarbons in the final degassing step; nitrogen is therefore often used. Depending on the catalyst system used during the upstream polymerization process, a deactivation agent (e.g. steam and/or oxygen) may also be injected to deactivate the catalyst and cocatalyst residues. Final degassing step using air instead of nitrogen is also known The residence time of the polymer powder in a primary degasser is usually below 5 minutes. The residence time of the polymer powder in either a secondary or combined degasser is preferably between 0.5 and 1.5 hours. The residence time of the polymer powder in a final degasser is also usually around 0.5 to 5 hours.

The present invention is particularly, and preferably, applied in a polymer powder degasser vessel of relatively large size, by which is meant having a silo volume of at least 30 m$^3$, such as in the range 30 to 500 m$^3$, and more preferably a silo volume of at least 50 m and/or up to 400 m$^3$.

The preferred vessels in which the present invention may be applied are secondary degassers, combined degassers and/or final degassers.

The polymer powder degasser vessel may also be provided with a surge capacity, generally located above the silo, which provides additional volumetric capacity in the vessel. The surge capacity is usually provided by a larger cylindrical to the main vertical cylinder, for example by one of more conical sections. For avoidance of doubt, the volume of the silo as used herein does not include any such additional capacity.

As already noted, the exact design of the polymer powder degasser vessel is important for the required flow pattern of the polymer powder inside the silo to be a mass flow pattern. The man skilled in the art knows how to design said silos. The silo in the present invention comprises a vertical cylinder and a hopper at the bottom of said vertical cylinder. The hopper is preferably an inverted right circular cone shape with walls which are sufficiently steep and/or smooth to satisfy the mass flow pattern requirement of the polymer powder; and which preferably ends with an opening at its lower part. The upper cylindrical perimeter of the hopper preferably coincides with the bottom perimeter of the silo. Some silo designs, in particular the one applicable to the polisher silo, also comprise an additional larger cylindrical head at the top of the cylinder, the connection between the cylindrical head and the main cylinder is usually of a conical shape. The silo may also comprise a dome at the top of its vertical cylinder. Preferably, the volume of the cylinder represents more than 50%, preferably more than 80%, for example more than 90% of the total volume of the silo.

The process of the present invention may be used with any polymer powder, even those that are generally considered as "free-flowing" or "easy-flowing".

Powder flow properties are typically characterised by testing in a shear cell. An example of such a test is described in ASTM D 6773-02 "Standard Shear Test Method for Bulk Solids Using the Schulze Ring Shear Tester". As described in ASTM D 6773-02, the flow function of a polymer powder is a plot of the unconfined yield strength of the powder versus major consolidation stress. In general, polymers are rated in their flowability in terms of the flowability ratio, ffc, which is defined as the ratio of the consolidation stress to the unconfined yield strength, as follows:

| | |
|---|---|
| ffc < 1 | non-flowing |
| 1 < ffc < 2 | very cohesive (to non-flowing) |
| 2 < ffc < 4 | cohesive |
| 4 < ffc < 10 | easy-flowing |
| 10 < ffc | free-flowing. |

In one embodiment the present invention may be applied to polymer powders with a value of ffc less than 4. In another embodiment the present invention may be applied to polymer powders with values above 4, such as above 6, or above 7.

It should be noted that the flowability ratio of a polymer powder may change as a function of the consolidation pressure and also of temperature. As used herein, the flowability ratio of the polymer powder is the value measured using the instantaneous shear test described in ASTM D 6773-02 at a consolidation pressure of 2000 Pa and at a temperature that is equal to the temperature of the polymer powder at the bottom end of the hopper of the silo where the recirculation will be implemented. For example, the flowability ratio of the polymer powder can be measured at a temperature of the polyethylene powder of 65° C.

When the process according to the present invention is applied to a polymer powder degasser vessel, said polymer powder contains hydrocarbons residues coming from the upstream polymerisation process and/or an upstream polymer degassing stage. The hydrocarbon content of the polymer powder after treatment in a degasser vessel is the residual hydrocarbons content. As used herein "residual hydrocarbons" are hydrocarbons that are absorbed on the polymer. Such components do not form part of the chemical structure of the polymer powder and are removable by degassing. Residual hydrocarbons will include alkanes, as well as comonomers and principle monomer that have not reacted in the polymerisation reaction. Typically, the polymer powder as introduced into the polymer powder degasser vessel in the process of the present invention comprises residual hydrocarbons in an amount of 0.1 to 25% by weight of the one or more hydrocarbons having 3 to 10 carbon atoms, for example 0.5 to 15% by weight.

The residual hydrocarbon content in a polymer powder is suitably measured by multiple head space analysis of a sample of the polymer. Head space analysis is a known technique for measuring the volatile components present in a sample. A number of commercially available analysis systems are available, for example Turbomatrix HS-40, available from Perkin Elmer Life and Analytical Sciences, Shelton, Conn., United States. For the purposes of the present invention, the residual hydrocarbon content can be measured on a Perkin Elmer Turbomatrix HS-40 with a 0.1 g sample held in a 22 ml sample vial maintained at 100° C., and equipped with a gas chromatograph (GC) with FID detector, for analysis of the extracted samples. The sample in the vial is pressured to 12 psi with nitrogen carrier gas. The head space is then extracted and transferred to the gas chromatograph for analysis. The process of pressurisation/extraction should be repeated 5 times (multiple head space extraction), and the results totalled for each component identified by the GC to provide the residual hydrocarbon content for each hydrocarbon component present.

The present invention is preferably applied to a continuous process, and most preferably in a polymer powder degasser vessel downstream of a continuous polymerization reaction process. Thus, in a further aspect the present invention provides a process for the polymerisation of olefins which comprises
i) polymerising one or more olefins in a polymerisation reactor, preferably continuously,
ii) passing polymer powder obtained from the polymerisation reactor to a polymer powder degasser vessel, and
iii) operating the polymer powder degasser vessel as described in the first or second aspects described above.

Said continuous polymerization reaction can take place in any appropriate reactor, such as a gas phase reactor, a gas/liquid phase reactor or a slurry reactor. In this configuration, the vessel is typically located downstream of the polymerization reactor and upstream of the polymer powder extruder.

The principal olefin in such a polymerisation reaction may be selected from olefins having 2 to 6 carbon atoms such as ethylene, propylene, 1-butene, 1-hexene and 4-methyl-1-pentene, and most preferably is ethylene or propylene.

Comonomer olefins, where present, are preferably selected from olefins other than the principal olefin having 2 to 12 carbon atoms. Suitable comonomer olefins are ethylene, propylene, 1-butene, 1-hexene, 4-methyl-1-pentene and 1-octene. Preferably, the principal olefin is ethylene or propylene and the comonomer is ethylene, propylene, 1-butene, 1-hexene or 1-octene. More preferably, the olefin is ethylene and the comonomer is 1-butene, 1-hexene or 1-octene, preferably 1-hexene or 1-butene.

The reaction mixture may also comprise one or more inert compounds, especially inert gases such as nitrogen, and/or one or more saturated hydrocarbons such as ethane, propane, butane, pentane and hexane.

When the olefin polymerisation reaction is in slurry phase, the reactor is preferably a slurry loop reactor. Slurry phase polymerisation of olefins is well known. In a slurry polymerisation process an olefin monomer and optionally olefin comonomer are polymerised in the presence of a catalyst in a diluent in which the solid polymer product is suspended. Liquid full loop reactors are particularly well known in the art and are described for example in U.S. Pat. Nos. 3,152,872, 3,242,150 and 4,613,484.

The loop reactor is of a continuous tubular construction comprising at least two, for example four, vertical sections and at least two, for example four, horizontal sections. The heat of polymerisation is typically removed using indirect exchange with a cooling medium, preferably water, in jackets surrounding at least part of the tubular loop reactor. The volume of the loop reactor can vary but is typically in the range 50 to 200 cubic meters.

Slurry polymerisation is typically carried out at temperatures in the range 50° C.-125° C. and at absolute pressures in the range 0.5-10 MPa, preferably 1.5 to 5 MPa. The catalyst used can be any catalyst typically used for olefin polymerisation such as chromium oxide, Ziegler-Natta or metallocene-type catalysts. The product slurry comprising polymer and diluent, and in most cases catalyst, olefin monomer and comonomer can be discharged intermittently or continuously, optionally using concentrating devices such as hydrocyclones or settling legs to minimise the quantity of fluids withdrawn with the polymer.

The withdrawn slurry is typically depressurised and heated to vaporise (or flash) at least the majority of the liquid phase (principally diluent). The vaporized components are separated from the polymer solids, and any remaining liquid, in what is commonly referred to as a flash vessel, although flashing in fact may take place prior to this vessel during the depressurization and heating.

When the polymerization reaction is in the gas phase, the method may be carried out in a stirred and/or gas fluidised bed. Gas phase polymerisation of a polymerisable olefin or mixture thereof to produce normally solid polymer substances using a quench-cooled, gas-phase polymerisation reactor containing a sub-fluidised particulate bed of polymerised olefin has been described in a number of patents including: U.S. Pat. Nos. 3,957,448, 3,965,083 and 3,971,768. These US Patents describe polymerisation processes and apparatus in which polymer is formed from gaseous olefin in horizontal stirred-bed vessels.

Preferably, the polymerisation process is carried out continuously in the gas phase in a fluidised-bed reactor. Such processes are well-known, and examples include EP 0475603, EP 1240217, EP 1484344 and EP 0855411.

In such processes, the particles of polymer being formed are maintained in the fluidised state by virtue of a reaction gas mixture containing the monomer(s) to be polymerised travelling in a rising stream. The polymer thus manufactured in powder form is generally drained from the reactor in order to keep the bed of fluidised polymer particles at a more or less constant volume. The process generally employs a fluidisation grid which distributes the reaction gas mixture through the bed of polymer particles and which acts as a support for the bed in the event of a cut in the flow of the rising gas. The reaction gas mixture leaving at the top of the fluidised-bed reactor is recycled to the base of the latter under the fluidisation grid by means of an external circulation conduit.

The polymerisation of the olefins is an exothermic reaction. In a gas phase process the reaction mixture comprising the olefins to be polymerised is generally cooled by means of at least one heat exchanger arranged on the outside of the reactor before being recycled. Liquid, especially but not limited to liquid condensed from the cooled reaction mixture during recycle, may be injected into the reaction zone. Vaporisation of the liquid in the reaction zone provides the effect of cooling directly in the reaction zone.

The gas phase polymerisation is typically carried out at an absolute pressure of between 0.5 and 6 MPa, preferably 1.5 to 3 MPa, and at a temperature of between 30° C. and 130° C. For example, for LLDPE production the temperature is suitably in the range 65-100° C. and for HDPE the temperature is typically 80-115° C. depending on the activity of the catalyst used and the polymer properties desired.

The process may be applied to polymerisation processes using any suitable polymerisation catalyst, including Ziegler-Natta type catalysts chromium oxide type catalysts, and metallocene type catalysts. Preferred catalysts include those described in WO 2011/085937.

The catalyst may be used in the form of a prepolymer prepared beforehand during a prepolymerisation step. The prepolymerisation may be carried out by any process, for example a prepolymerisation in a liquid hydrocarbon or in gas phase in accordance with a batchwise, semicontinuous or continuous process.

The catalyst or the prepolymer may be introduced into the reactor continuously or discontinuously.

Figure 1:
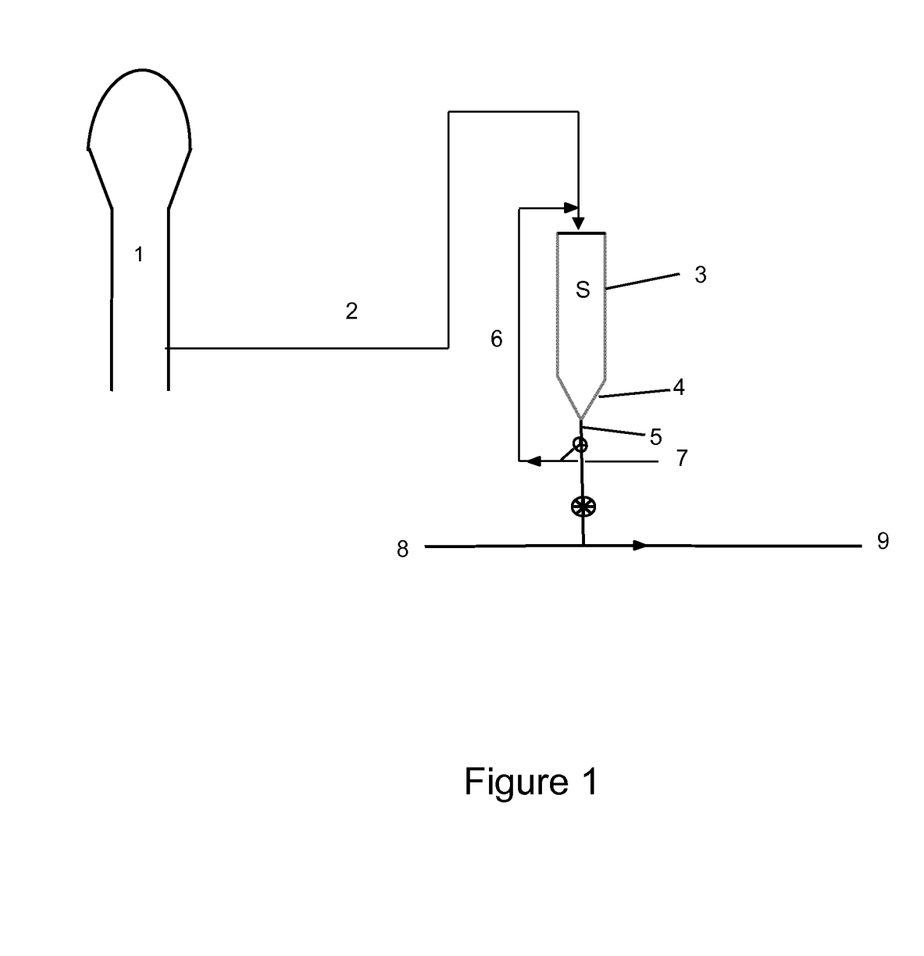
FIGS. 1 and 2 describe process configurations which can be used in the present invention.

With reference to FIG. 1, a polymer powder is withdrawn from a fluidised bed gas phase polymerisation reactor (I) and passed via a line (2) into a polymer powder degasser vessel comprising a silo (S) the silo comprising a main vertical cylinder (3), a hopper (4) and a polymer powder withdrawal pipe (5). Polymer powder is withdrawn from the silo (S) via line (5). A portion of the polymer powder is separated in a diverter valve and using a conveying gas from a line 7, for example nitrogen, is recycled via a recycle line (6) to the top of the polymer degasser vessel. Withdrawn polymer which is not recycled is conveyed, for example using nitrogen as a conveying gas from line 8, via line 9 to further processing (not shown in FIG. 1).

Figure 2:
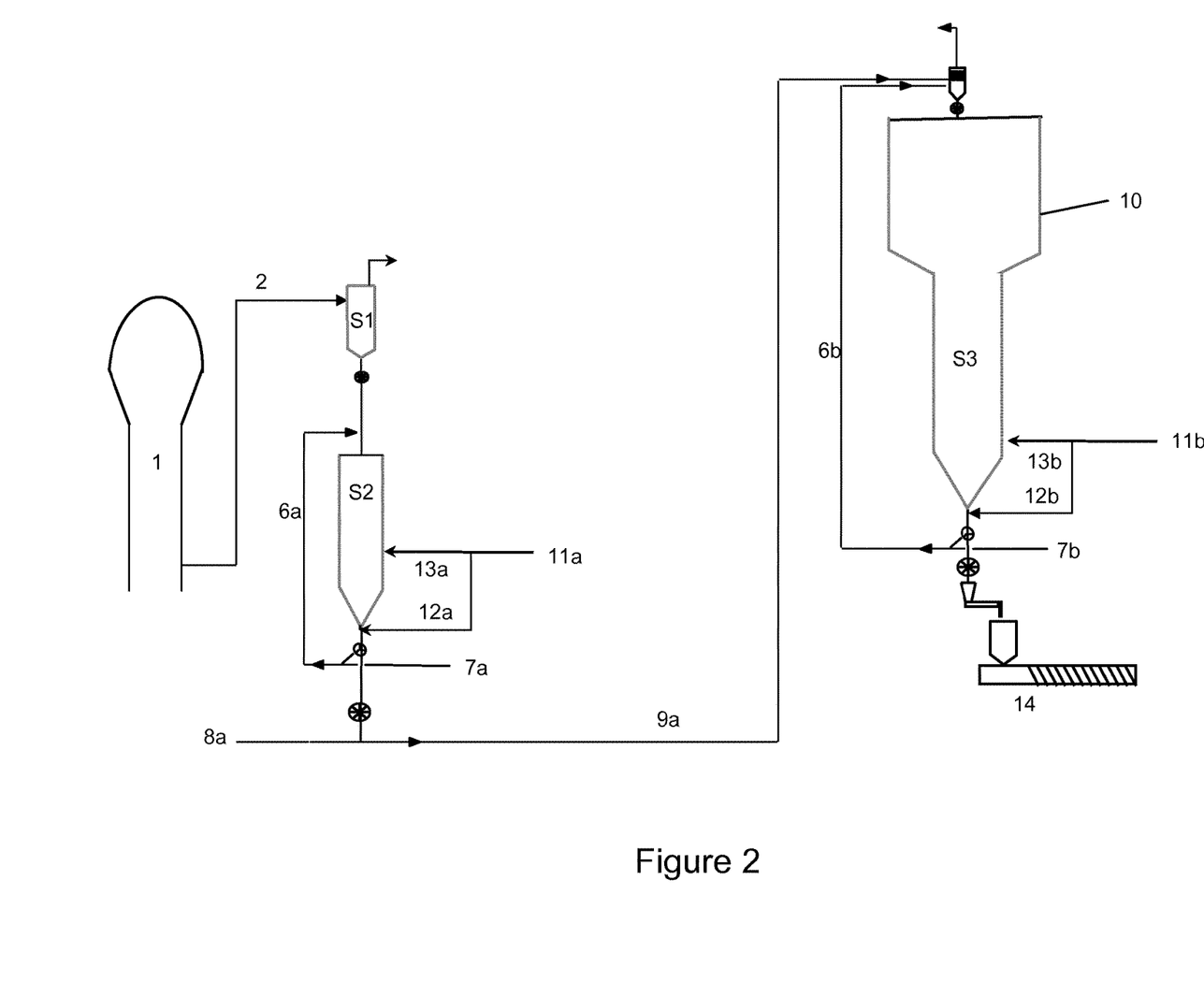

In another embodiment, which is described in FIG. 2, there is provided a degassing train which comprises a primary degasser vessel comprising a silo S1, a secondary degasser vessel comprising a silo S2 and a final degasser vessel comprising a silo S3. In this case each of the degasser vessels comprises a main vertical cylinder, a hopper and a polymer powder withdrawal pipe as in FIG. 1 (although these have not been labelled to ease clarity of FIG. 2). Polymer recovered from the primary degasser vessel is passed (in this case by gravity) to the secondary degasser vessel, whilst polymer from the secondary degasser vessel is passed via line 9a, using a conveying gas from 8a, to the final degasser vessel.

It can be noted that the primary degasser vessel in this FIG. 2 is not operated according to the invention as neither a recirculation line nor a purge gas is provided.

In contrast, however, each of the secondary and final degasser vessels comprise a recycle line (6a, 6b) by which a portion of the polymer powder separated in a diverter valve and, using a conveying gas from line 7a, 7b, can be recirculated to the respective silo. In the secondary degasser vessel this line (7a) is to the top of the polymer degasser vessel. In the final degasser vessel, the recirculated polymer is recirculated to the top of a surge capacity (10) which is provided in the final degasser vessel above the silo (S3). (The top of the silo and the bottom of the surge capacity is defined here by the height at which the degasser vessel starts to expand in diameter.)

The secondary degasser also comprises a line 11a by which a purge gas, such as nitrogen, can be supplied to the silo (S2). In particular, this purge gas line is split into a first line (12a) which feeds to an inlet on the polymer powder withdrawal pipe ("hopper inlet" and a second line (13a) which feeds to an inlet on the main vertical cylinder.

Similarly, the final degasser comprises a line 11b by which a purge gas, such as nitrogen, can be supplied to the silo (S3), and in particular via a first line (12b) which feeds to an inlet on the polymer powder withdrawal pipe ("hopper inlet") and a second line (13b) which feeds to an inlet on the main vertical cylinder.

Polymer withdrawn from the final degasser and not recirculated is passed to further processing, which in this FIG. 2 is exemplified by an extruder (14).

It can be noted that FIG. 2 describes two embodiments for the recirculation with the recirculation line 6a being directly connected to the upper part of the silo S2 and the recirculation line 6b being connected upstream of the silo S3 (and in particular via a bag filter).

As shown in FIG. 2, the recirculation line 6a joins the polymer powder inlet line upstream of the secondary degasser vessel. It will be apparent that this line could equally recirculate separately to the secondary degasser vessel via a separate inlet. As shown in FIG. 2, the recirculation line 6b is passed to a filter (not labelled) along with the polymer powder line 9a from the secondary degasser vessel, and then the combined stream is passed from the filter to the final degasser vessel. It will be apparent that this line 6b could equally recirculate separately to the final degasser vessel via a separate inlet, for example also via a separate filter. It will also be apparent that this line could equally connect to line 9a upstream of the filter.

According to another embodiment not shown on the Figures, a surge capacity may also be integrated in parallel to a degasser vessel.

The invention claimed is:

1. Process for operating a polymer powder degasser vessel which vessel comprises a silo comprising a main vertical cylinder and a hopper at the bottom of the cylinder, there being a polymer powder withdrawal pipe connected to the hopper by which polymer powder is withdrawn from the hopper, and wherein the silo contains a polymer powder which occupies less than 45% of the volume of the silo, further wherein at least one of the following is applied:
  i) polymer powder is withdrawn from the hopper and recirculated to the silo, wherein the recirculation rate of the polymer powder is at least 30 percent per hour of the polymer powder present in the silo, and
  ii) a purge gas provided to the silo via the polymer powder withdrawal pipe or via an inlet located on the hopper at a vertical height which is less than half of height of the hopper from its bottom end.

2. A process as claimed in claim 1 wherein the polymer powder occupies less than 30% of the volume of the silo.

3. A process as claimed in claim 1 wherein the recirculation rate is at least 40 percent per hour of the polymer powder present in the silo.

4. A process as claimed in claim 1 wherein the purge gas is provided to the silo via the polymer powder withdrawal pipe.

5. A process according to claim 1 wherein there is provided a polymer powder inlet pipe connected to the polymer powder degasser vessel at a height located above the polymer powder and wherein the polymer powder is withdrawn from the hopper and recirculated via the polymer powder withdrawal pipe to a location upstream of the silo or to the silo at a height located above the polymer powder.

6. A process as claimed in claim 5 wherein the polymer powder inlet pipe is connected to the silo at a height located above the surface of the polymer powder inside the silo.

7. A process as claimed in claim 1 wherein the polymer powder withdrawal pipe is connected to the bottom end of the cone of the hopper.

8. A process as claimed in claim 1 wherein the polymer powder withdrawal pipe is divided into a main polymer powder withdrawal pipe and a secondary polymer powder recirculation pipe.

9. A process as claimed in claim 1 wherein the silo has a volume of 30 to 500 m$^3$.

10. A process for the polymerisation of olefins which comprises
  i) polymerising one or more olefins in a polymerisation reactor,
  ii) passing polymer powder obtained from the polymerisation reactor to a polymer powder degasser vessel, and
  iii) operating the polymer powder degasser vessel according to the process of claim 1.

11. A process as claimed in claim 10 wherein the polymerization reactor is a gas phase reactor, a gas/liquid phase reactor or a slurry reactor for the polymerisation of ethylene and/or propylene.

12. Process for operating a polymer powder degasser vessel which comprises a silo comprising a main vertical cylinder and a hopper at the bottom of the cylinder, there being a polymer powder withdrawal pipe connected to the hopper by which polymer powder is withdrawn from the hopper, and which process comprises switching between a first set of conditions which are applied when the silo contains a first amount of polymer powder and a second set of conditions which are applied when the silo contains a second amount of the same polymer powder, the first and second amounts being different, and wherein at least one of the following applies:
  i) the second amount of polymer powder is greater than the first amount of polymer powder, and the flow rate at which polymer powder is withdrawn from the hopper and recirculated to the silo is less in the second set of conditions than in the first set of conditions,
  ii) the second amount of polymer powder is less than the first amount of polymer powder, and the flow rate at which polymer powder is withdrawn from the hopper and recirculated to the silo is higher in the second set of conditions than in the first set of conditions,
  iii) the locations by which purge gas is supplied to the silo differ in the second set of conditions compared to the first set of conditions.

13. A process as claimed in claim 12 wherein the lower amount of polymer powder is such that the polymer powder occupies less than 45% of the volume of the silo.

14. A process as claimed in claim 12 wherein the lower amount of polymer powder is such that the polymer powder occupies less than 30% of the volume of the silo.

15. A process as claimed in claim 12 wherein the higher amount of polymer powder is such that the polymer powder occupies at least 50% of the volume of the silo and/or the higher amount is such that the polymer powder occupies at least 20% by volume of the silo more than the lower amount.

16. A process as claimed in claim 12 wherein the higher recirculation flow rate is at least 1 tonne per hour and/or is at least 30% percent per hour of the polymer powder present in the silo.

17. A process as claimed in claim 12 wherein the lower recirculation flow rate is less than 50% of the higher recirculation flow rate.

18. A process as claimed in claim 17 wherein the higher recirculation flow rate is at least 5 tonnes per hour and/or is at least 40% percent per hour of the polymer powder present in the silo.

19. A process as claimed in claim 12 wherein the silo comprises at least one inlet by which purge gas is provided which is located on the cylinder section of the silo (hereinafter "cylinder inlet") and at least one inlet by which purge gas is provided to the silo via the polymer powder withdrawal pipe or via an inlet located on the hopper at a vertical height which is less than half of height of the hopper from its bottom end (hereinafter "hopper inlet"), and where the second amount of polymer powder is greater than the first amount of polymer powder then amount of purge gas which is introduced via the hopper inlet is less under the second set of conditions than the amount introduced via the hopper inlet under the first conditions, and vice versa.

20. A process as claimed in claim 19 where the larger amount of polymer powder occupies at least 50% by volume of the silo and no purge gas is applied to the hopper inlet under the corresponding set of conditions.

21. A process as claimed in claim 12 wherein the purge gas is provided to the silo via the polymer powder withdrawal pipe.

22. A process according to claim 12 wherein there is provided a polymer powder inlet pipe connected to the polymer powder degasser vessel at a height located above the polymer powder and wherein the polymer powder is withdrawn from the hopper and recirculated via the polymer powder withdrawal pipe to a location upstream of the silo or to the silo at a height located above the polymer powder.

23. A process as claimed in claim 22 wherein the polymer powder inlet pipe is connected to the silo at a height located above the surface of the polymer powder inside the silo.

24. A process as claimed in claim 12 wherein the polymer powder withdrawal pipe is connected to the bottom end of the cone of the hopper.

25. A process as claimed in claim 12 wherein the polymer powder withdrawal pipe is divided into a main polymer powder withdrawal pipe and a secondary polymer powder recirculation pipe.

26. A process as claimed in claim 12 wherein the silo has a volume of 30 to 500 m³.

27. A process for the polymerisation of olefins which comprises
   i) polymerising one or more olefins in a polymerisation reactor,
   ii) passing polymer powder obtained from the polymerisation reactor to a polymer powder degasser vessel, and
   iii) operating the polymer powder degasser vessel according to the process of claim 12.

28. A process as claimed in claim 27 wherein the polymerization reactor is a gas phase reactor, a gas/liquid phase reactor or a slurry reactor for the polymerisation of ethylene and/or propylene.

\* \* \* \* \*